Nov. 18, 1930.  G. G. FRATER  1,782,202
HIVE FRAME
Filed Dec. 7, 1929
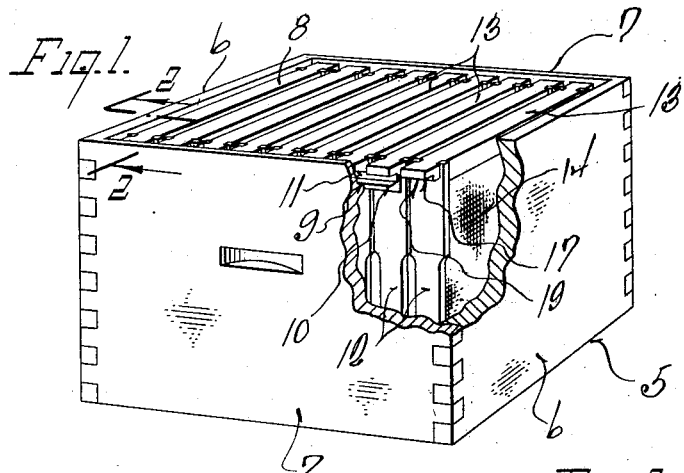
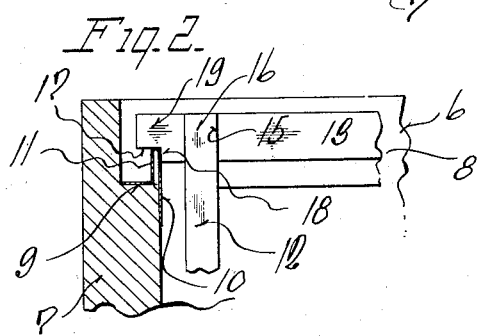 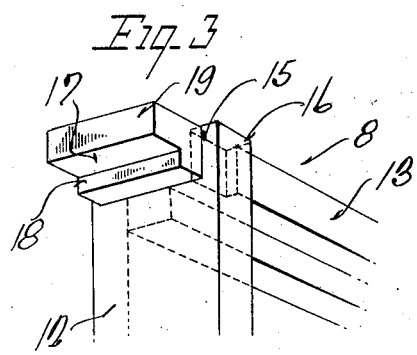
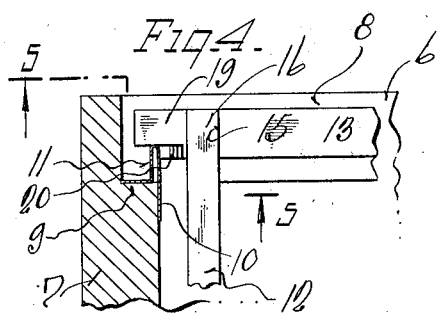 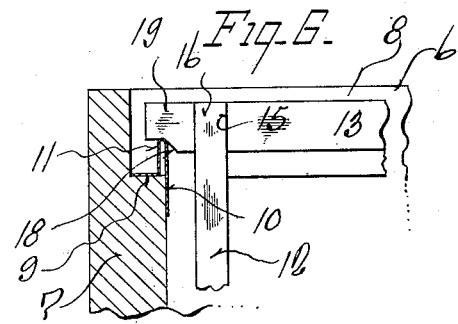
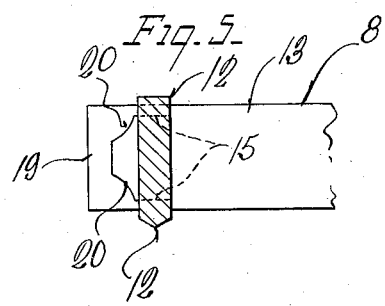
Inventor
Gordon G. Frater
By Ira Milton Jones
Attorney Patented Nov. 18, 1930

1,782,202

UNITED STATES PATENT OFFICE

GORDON G. FRATER, OF WATERTOWN, WISCONSIN, ASSIGNOR TO G. B. LEWIS COMPANY, OF WATERTOWN, WISCONSIN, A CORPORATION OF WISCONSIN

HIVE FRAME

Application filed December 7, 1929. Serial No. 412,433.

This invention relates to certain new and useful improvements in frames for honey combs and has as an object the provision of an improved frame structure having increased rigidity and having positive means for endwise spacing the frame within the hive body or super without the necessity of extra attachments.

A more specific object of this invention resides in the provision of an improved frame having the ends of its top bar exteriorly of the side bars notched to provide integral shoulders which cooperate with the hive body or super to properly space the side bars within the hive.

Another object of this invention resides in the provision of an improved frame structure wherein the top bar end lugs adjacent the shoulder are of increased thickness to give the frame added strength at its natural breaking point.

And a still further object of this invention resides in the provision of an improved comb frame having an integral shoulder for spacing its side bars within the hive, which means automatically centers the frame within the hive.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated several complete examples of the physical embodiment of my invention constructed according to the best modes I have so far devised for the practical application of the principles thereof, and in which:

Figure 1 is a perspective view of a hive with the top removed and having frames therein constructed in accordance with my invention;

Figure 2 is an enlarged fragmentary detail view taken through one side wall of the hive on the plane of the line 2—2;

Figure 3 is a perspective view of the upper corner of the frame illustrating one form of my invention;

Figure 4 is a view similar to Figure 2 of a slight modification of my invention;

Figure 5 is a view partly in section and partly in elevation taken on the plane of the line 5—5 of Figure 4; and Figure 6 is a view of another modified form of my invention.

Referring now more particularly to the accompanying drawing in which like numerals designate like parts throughout the several views, 5 designates a hive body consisting of end members 6 and side members 7 adapted to have a plurality of sidewise arranged honey comb frames 8 supported therein from off-set shoulders 9 on the upper marginal edge portions of the sides 7. The shoulders 9 preferably have metal runners or supporting members 10 secured thereto, from which vertical ribs or beads 11 extend to support the frames 8.

Each frame 8 consists of side bars 12 connected at their upper ends by a top bar 13 and at their lower ends by a bottom bar, as shown in Letters Patent No. 1,725,448 issued Otto G. Erdman the 20th day of October, 1929, means being provided for suitably securing a comb foundation 14 within the frame.

As illustrated in the Erdman patent, the top bar is provided with a pair of opposed notches 15 in its sides adjacent each end to receive the bifurcated upper ends 16 of the side bars. The full thickness of the top bar extends beyond the side bars and has the bottom portion of its ends cut away, as at 17, to provide shoulders 18 spaced from the adjacent side bars a distance it is desired to hold the side bars from the sides 7 of the hive, the shoulders 18 abutting the vertical ribs 11 in the manner illustrated in Figures 2, 4 and 6.

Heretofore, the ends of the top bars 13 have been reduced in thickness from a point adjacent the inner faces of the side bars, and staples or other similar means have been driven into the side bars to provide a stop to space the ends of the frames from the hive sides 7. This construction has been objectionable in that the reduced thickness of the top bar ends weakened it at a point where breakage is most likely to occur, especially during handling of the hive when the combs are full of honey. The use of staples and other separate means for spacing the frame endwise also weakened the structure and involved additional expense. The structure of this invention, therefore, overcomes these objectionable features and eliminates to a large degree breakage in handling, in addition to providing a simplified and improved positive spacing means for the frame.

In the structure illustrated in Figures 4 and 5, the shoulder 18 is cut away at its corners, as at 20, to eliminate the surface bearing against the bead 11 and thus reduce the surface most apt to be glued or waxed to the bead by the bees, and in Figure 6 the shoulder 18 is illustrated as inclined downwardly and inwardly so that in the event the frame is carelessly placed within the hive its own weight will tend to center the same, the inclined shoulders acting in the manner of cams.

From the foregoing description, taken in connection with the accompanying drawing, it will be readily apparent to those skilled in the art to which an invention of the character described appertains, that I provide a novel and improved frame structure which provides a simple means for spacing the frame endwise within the hive and in which the top bar is materially strengthened.

What I claim as my invention is:

1. A device of the character described including a top bar and side pieces, the side pieces having their upper ends bifurcated to receive the top bar therein, and an abutment on the top bar adjacent each end and located medially of the adjacent side piece outer surface and the top bar end, said abutments being formed by reducing the outer end portions of the top bar.

2. A device of the character described, including a top bar and side pieces, the top bar having recesses in its opposite sides of a width substantially equal to the thickness of the side pieces, and the adjacent ends of the side pieces being bifurcated and having spaced projections received in the recesses of the top bar, abutments formed on the top bar adjacent its ends and outwardly of the side pieces, said abutments providing means limiting endwise movement of the frame within a hive, and means securing the top bar to the side pieces.

3. A device of the character described, including a top bar and side pieces, the top bar having recesses in its opposite sides of a width substantially equal to the thickness of the side pieces, and the adjacent ends of the side pieces being bifurcated and having spaced projections received within the recesses of the top bar, abutments formed on the top bar adjacent its ends and outwardly of the side pieces, said abutments providing means limiting endwise movement of the frame within a hive, means securing the top bar to the side piece, and said abutments being inclined downwardly and inwardly.

In testimony whereof I have hereunto affixed my signature.

GORDON G. FRATER.